United States Patent [19]

Grotz, Jr.

[11] Patent Number: 4,624,842
[45] Date of Patent: * Nov. 25, 1986

[54] TEMPERATURE CONTROLLED AMMONIA SYNTHESIS PROCESS

[75] Inventor: Bernard J. Grotz, Jr., Pasadena, Calif.

[73] Assignee: C. F. Braun & Co., Alhambra, Calif.

[*] Notice: The portion of the term of this patent subsequent to Apr. 9, 2002 has been disclaimed.

[21] Appl. No.: 720,593

[22] Filed: Apr. 8, 1985

Related U.S. Application Data

[63] Continuation-in-part of Ser. No. 444,720, Nov. 26, 1982, Pat. No. 4,510,123.

[51] Int. Cl.$^4$ ................................................ C01C 1/04
[52] U.S. Cl. ..................................... 423/360; 423/361
[58] Field of Search ......................... 423/359, 360, 361

[56] References Cited

U.S. PATENT DOCUMENTS

| 3,851,046 | 11/1974 | Wright et al. | 423/359 |
| 3,957,449 | 5/1976 | Ciechowski | 423/360 |
| 4,230,680 | 10/1980 | Becker et al. | 423/360 |
| 4,510,123 | 4/1985 | Grotz | 423/360 |

Primary Examiner—John Doll
Assistant Examiner—Wayne A. Langel
Attorney, Agent, or Firm—Lyon & Lyon

[57] ABSTRACT

A process for synthesizing ammonia with improved efficiency is disclosed. The increase in efficiency is achieved by regulation of the temperature of at least three catalyst beds connected in series by a combination of influent/affluent heat exchange and high pressure heat sinks.

6 Claims, 2 Drawing Figures

TEMPERATURE CONTROLLED AMMONIA SYNTHESIS PROCESS

CROSS REFERENCE TO RELATED APPLICATIONS

The present application is a continuation-in-part of U.S. Ser. No. 444,720, filed Nov. 26, 1982, now U.S. Pat. No. 4,510,123 entitled "Temperature Controlled Ammonia Synthesis Process", the disclosure of which is hereby specifically incorporated by reference.

BACKGROUND OF THE INVENTION

The field of the present invention relates generally to the synthesis of ammonia in a continuous process whereby a gas mixture containing an approximately stoichiometric ratio of hydrogen and nitrogen is passed over a series of catalyst beds at relatively high pressure and controlled temperatures. Specifically, the invention herein relates to temperature regulation in this process by means of heat exchange effected between portions of the gas mixture itself at various stages of its progress through the process.

Ammonia production as commercially practiced utilizes the seemingly straightforward reaction between nitrogen and hydrogen in stoichiometric amounts: $N_2 + 3H_2 \rightarrow 2NH_3$. The reaction is exothermic; accordingly, the equilibrium is shifted to the right by lower temperatures. However, as a practical matter, the temperature must be maintained at an elevated level in order to increase the reaction rate sufficiently to carry out the process in a reasonably short amount of time, even though catalysts are also used to accelerate the rate of the reaction. Thus, an appropriate balance between thermodynamic and kentic considerations determines the appropriate temperature range at which the synthesis should be operated.

Thermodynamic considerations would also militate that the reaction would be favored by higher pressure. The pressure range at which this process is generally carried out is over 100 atmospheres, although it has been disclosed that synthesis procedures are possible with pressures of as low as 20 atmospheres (U.S. Pat. No. 3,957,449).

Temperature regulation is most often accomplished by a "quench" type ammonia conversion process. In this process, the synthesis gas containing nitrogen and hydrogen in roughly stoichiometric amounts (syngas), preferably with as few diluents as possible, is passed through a catalytic bed of, for example, iron or promoted iron, to produce an efflucent which is at a higher temperature than the original mixture due to the exothermic nature of the reaction. The effluent contains some percentage of ammonia, representing for example, 10 to 15% total volume. The temperature of the emerging gas is ordinarily sufficiently high to thermodynamically inhibit further reaction. Therefore, before the effluent is passed through still another catalyst bed in order to increase the percentage conversion to ammonia, it is mixed with "cold" fresh synthetic gas thus lowering the temperature of the new mixture to the proper level. This process may be repeated for as many passes through catalyst beds as is desired. However, it suffers from the drawback that obviously not all of the syngas will pass through all of the catalyst beds.

U.S. Pat. No. 4,230,680 to Becker describes an alternative process whereby rather than mixing fresh syngas with partially converted effluent, only heat exchange between the fresh syngas and effluent is effected. In the Becker process, a portion of effluent from each and every catalytic bed in the series is passed through a heat exchanged in which a portion of the feed syngas provides a heat sink. U.S. Pat. No. 3,851,046 to Wright and Pickford discloses a two-bed process in which head exchange is effected between effluent from the first bed and fresh syngas and the effluent from a single second bed is cooled by high-pressure steam generation. Both of the foregoing approaches turn out to be less efficient than that of the present invention wherein only the effluent from the first pass of syngas over catalyst is heat exchanged; and further cooling of subsequent effluents from multiple beds is accomplished by a high temperature heat sink.

SUMMARY OF THE INVENTION

The invention herein relates to a process for synthesis of ammonia carried out a pressure greater than 100 atmospheres which established control of the temperature of the synthesis reaction through a combination of heat exchange between portions of the gas mixture flowing through the system, and the use of a high temperature heat sink to cool effluents from a series of at least three catalyst beds.

More specifically, the present invention relates to a process for synthesis of ammonia which employs a heat exchange between only the effluent of the first pass of syngas over a catalyst bed and at least a portion of the fresh syngas. Additional temperature control with respect to effluent of each of multiple succeeding catalytic beds is accomplished by including in the system, in series with each bed, a high temperature heat sink which may be used for example, to generate steam, to superheat steam or to heat boiler feed water.

Thus, the present invention is directed to a more energy efficient process for the synthesis of ammonia wherein any approximate 30–35% conversion of the starting syngas may be obtained. The energy savings are obtained by carrying out the process at a pressure greater than 100 atmospheres, preferably between 150 to 200 atmospheres, while utilizing at least three catalytic beds. The syngas is initially preheated in a heat exchanger by the effluent from the third catalytic bed after it has been used in a high temperature heat sink. A first portion of the syngas is further preheated by heat exchange with the effluent from the first catalytic bed and then combined with a second portion of the syngas which has not received additional heat exchange. After this heat exchange, the effluent from the first catalytic bed is passed to the second catalytic bed where further ammonia conversation is accomplished. All of the heated effluent from the second catalytic bed may then be passed to a high temperature heat sink to utilize the heat while also cooling the effluent. The cooled effluent stream is then passed at a temperature which will induce further ammonia production to a third catalytic bed wherein conversion of up to 35% of the feedstock to ammonia is completed. Thereafter, the effluent from the third catalytic bed is then used in a high temperature heat sink as well as to preheat the syngas used as a starting material.

While common sense teaches that the addition of a third catalytic reactor bed and another high temperature heat sink would be more expensive than a two-reactor system with one heat sink, the present invention discovered that addition of a third catalytic reactor bed results in a more efficient plant which does not cost substantially more than a plant with two bed catalyst reactors. The reason for this unexpected savings and efficiency is that the conversion per pass in the three-bed reactor increases, which reduces the recycle flow. The reduced recycle flow allows the use of smaller diameter pipe and equipment and smaller recycle and refrigeration compressors. Further, such savings are obtained by the use of a high temperature heat sink after the second and third catalytic beds. Accordingly, it is a primary object of the present invention to provide an improved process for the synthesis of ammonia.

DETAILED DESCRIPTION OF THE INVENTION

Definition and General Parameters:

As used herein, "syngass" or "synthesis gas" refers to a mixture of nitrogen and hydrogen in a ratio of 1:3 approximately, which may contain diluents such as argon and methane. While it is desirable to have zero diluent concentration, this is seldom achieved, and the syngas though composed substantially of hydrogen and nitrogen in stoichiometric ratio may be debilitated proportionally to the amount of contaminants therein. The process of the invention is affected by the presence of such diluents in essentially the same manner as alternate methods for carrying out the synthesis would be so affected.

"Final product effluent" represents the gas which has passed through the entire system and which is to be subjected to recovery processes to extract the ammonia therefrom.

Catalysts which are successful in accelerating the synthesis of ammonia are well known in the art. Prominent among these are finely divided iron, and promoted iron. While presumably the discovery of a superb catalyst which accelerates the reaction sufficiently that it would proceed at an acceptable rate at, for example, 200°-260° C. would alter the desired temperatures quoted hereinafter, the general principle on which the process of the invention rests would not be altered by the substitution of such improved catalysts, should they become known. However, of course, the preferred temperature ranges would be correspondingly lowered.

There are also a variety of designs for equipment which would contain the catalyst bed and through which the syngas flows in order to effect the conversion. The two major types of synthesis chambers which are now known are radial flow converters, and more commonly the OSW type ammonia converter in which the synthesis gas flow is downward or axial through the teds. The descriptions of several commercial converters are set forth in *Ammonia* Part III, edited by A. V. Slack and G. Russell James (1977), the disclosure of which is specifically incorporated herein by reference. The pattern of flow through the converter is not critical to the process of the invention.

Finally, no matter how many catalytic beds are employed, it is impracticable to obtain complete conversion of the synthesis gas to ammonia. Typically, the first catalytic pass results in a conversion of from 15 to 20% of the starting materials to ammonia, and succeeding passes result in further conversions. By application of the process of the present invention, after employing at least three converters in series, the final product effluent should contain approximately 20% ammonia by volume which represents approximately 30-35% conversion of the starting material.

DETAILED DESCRIPTION OF A PREFERRED EMBODIMENT

Figure 1:
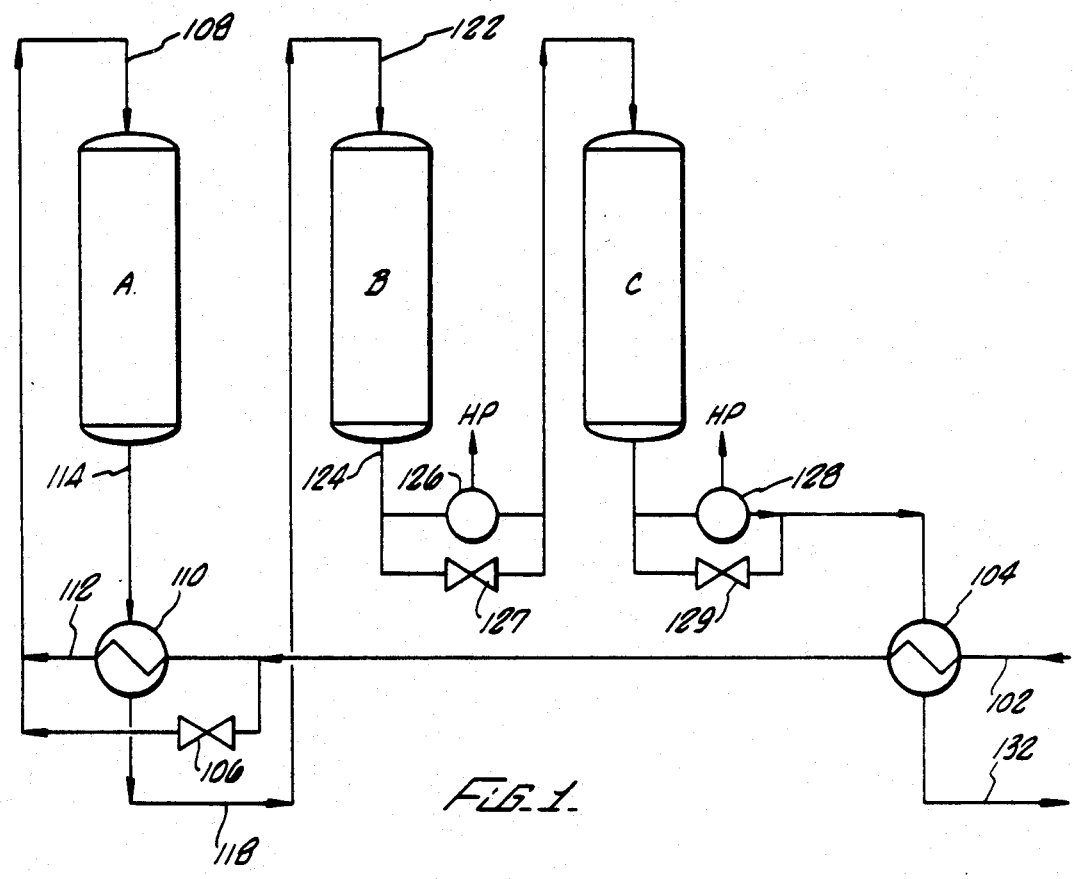
FIG. 1 is a schematic showing an embodiment of the invention wherein three catalytic beds are employed.

The preferred embodiment is best understood with reference to FIG. 1.

Syngas, as purified as is possible, enters the system at 102 and is passed through heat exchanger 104 in which the heat source is at least a portion of the final product effluent.

The process for the synthesis of ammonia is carried out at a pressure greater than 100 atmospheres, and preferably at a pressure range between approximately 150 to about 200 atmospheres.

The syngas which has thus been heated, preferably to a temperature of approximately 260 to 315C. is then divided using the bypass control line with valve at 106, so that a portion of it passes directly finally to the first of the catalytic beds (A) at 108, and another portion passes through the heat exchanger 110 where it is used to cool the effluent from the first catalytic converter, and resulting in its temperature being further raised. The effluent from the heat exchanger 110 is then combined at 112 with the syngas from the bypass and the mixture is fed into the first converter in the series at 108. The temperature of the combined gases as they enter the first converter, labeled A in FIG. 1, is preferably between 370° and 430° C. In passing through converter A, a portion of the nitrogen and hydrogen are converted to ammonia in an exothermic reaction such that the exit temperature at 114 is between 480° and 540° C. The effluent is cooled by providing the heat to the feed syngas in the aforesaid heat exchanger 110. Control over the final temperature before entry into catalyst bed B is maintained by the by pass line controlled by valve 106 which controls the amount of cooling gas entering exchanger 110. The gas entering the second catalytic bed B at 122 is preferably between 370° and 430° C. Further conversion to ammonia takes place in converter B with generation of sufficient heat to provide an effluent with an exit temperature at 124 of 450° and 510° C. This effluent gas is cooled by operation of a high temperature heat sink 126 to a temperature of 370° to 430° C., the proper temperature for the pass over the catalyst bed in converter C. Control over this process is maintained by a control valve in the bypass line at 127; the fraction of gas bypassing the steam generator being sufficient to retain the proper high temperature. Similarly, the reaction taking place in converter C results in an increase in temperature of the flowing gas mixture so that the temperature of the gas at the high temperature heat sink 128 is 430° to 480° C. As a result of the operation of the high temperature heat sink 128, the gas is cooled to 320° to 400° C. Again, a bypass and control valve, 129, is provided. At least a portion of the gas emerging from the high temperature heat sink 128 is passed through the heat exchanger 104 to heat the original feed syngas to a temperature of about 260° to 320° C. The final product effluent is then subjected, by conventional means, to an ammonia recovery process.

By means of the operation of this process, a conversion of about 35% of the syngas to ammonia is achievable with three catalyst beds. By balancing the temperatures and control through heat exchange between the flowing gas at various stages of reaction, but hsuing high temperature heat sinks after multiple catalytic beds, subsequent to the first, a comparatively high conversion is achieved.

The preferred embodiment described is provided with control mechanisms to regulate the temperatures by controlling bypass flow around the first heat exchanger (106) and around the high temperature heat sinks (127 and 129). However, the invention is not limited to these locations for regulatory opportunities. For example, a bypass with control valve could be provided subsequent to the high temperature heat sink 128 so as to control the amount of warming gas entering the heat exchanger 104. Also, for example, a bypass could be provided after the effluent from converter A so that only a portion of the heated gas would enter the heat exchanger 110.

Figure 2:
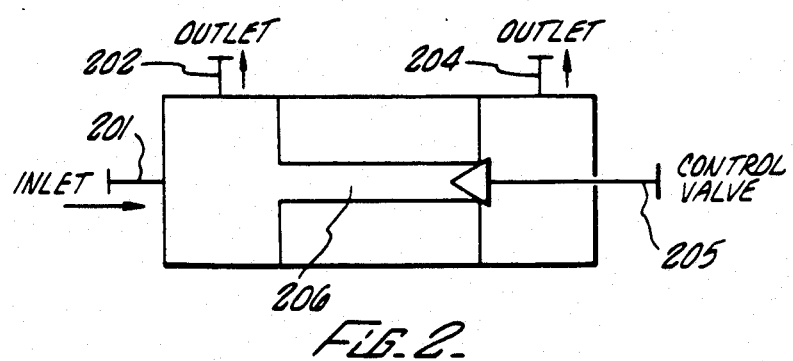
FIG. 2 shows a schematic of an internal bypass heat exchanger.

In all of these cases, and as shown in FIG. 1, the bypass may be by means of a separate bypass line with control valve. However, it is generally preferable to incorporate, instead, an internal bypass valve, as shown schematically in FIG. 2, instead of a separate line. In operation, the incoming gas through inlet 201 passes only through the tubes 203 when the control valve 205 is closed so as to prevent flow of gas through passage 206. Varying proportions of the gas are allowed to bypass the tubes 203 through passage 206 depending on the adjustment of the opening of this control valve. Bypass valves of this general construction are well known in the art, and provide additional economy by eliminating the need for an extra line.

While the description of the preferred embodiment has included reference to bypass controls, it has now been found that a bypass may not be required for the high temperature heat sink following the final reactor in series when the high temperature heat sink is a steam generator and 1500 psig or greater steam is generated in the process. It has also been found that bypass controls may not be needed when different high temperature heat sinks are utilized in a single process. Thus, the high temperature heat sink 126 might be a steam superheater while high temperature heat sink 128 might be utilized to heat boiler feed water. It should be noted that it may be desirable to utilize a steam superheater for high temperature heat sink 126 when there is not enough heat in the convection sector of the reformer to supply the necessary superheater where inadequate heat availability at the right temperature level makes superheating after the second reactor desirable.

The following example is intended to illustrate the invention. It is not to be construed as limiting the scope.

EXAMPLE 1

Referencing FIG. 1, through line 102 is introduced at 186 atmosphere pressure and 53° C. a feed gas stream containing 18,069 kg moles of hydrogen and 5.940 kg moles of nitrogen per hour. (The mixture contains, in addition, 840 kg moles of ammonia, 832 kg moles of argon and 211 kg moles of helim per hour; the helium and argon flows will remain substantially contant in this theoretical example). After passing through the heat exchanger 104, the temperature of the mixture is 283° C.; after passing through heat exchanger 110, and being recombined with the portion circulating through the bypass valve 106k the temperature of the gas is 400° C. The mixture is then passed over catalyst bed A for partial conversion to ammonia. The iron catalyst is in a 15 m$^3$ cylindrical bed of 2.48 m diameter and 3.1 m in length (iron oxide). The exit gas from A is at 518° C. and contains 2,549 kg moles of ammonia, 15,505 kg moles of hydrogen and 5.085 moles of nitrogen per hour, representing a total of approximately 20% conversion. The exit gas is then passed through heat exchanger 110 to attain a temperature of 400° C., whereupon it enters catalyst bed B. The catalyst bed in B is 46 m$^3$ and is also cylindrical of 3.0 m diameter and 6.6 m in length. After further conversion to ammonia, the exit gas from the catalyst B is a 483° C., and contains 3,740 moles ammonia, 13,720 moles hydrogen and 4,490 moles nitrogen per hour, representing a total conversion of 29%. The effluent from the high temperature heat sink when combined with the gas which has circulated through the bypass valve system at 129 is at 400° C. as it enters the third catalyst bed in the series, C. The catalyst bed at C is 77 m$^3$ and has a 3.2 m diameter and is 9.6 m long. After the pass over catalyst bed C. the effluent contains 4510 kg moles ammonia per hour, 12,564 kg moles hydrogen and 4105 kg moles nitrogen per hour, representing 35% total conversion. The temperature of the existing mixture, which is 454° C. is then lowered to 326° C. by the high temperature heat sink before further cooling in the heat exchanger 104. The final product effluent exiting at 132 then represents approximately 31% conversion to ammonia (based on nitrogen fed to the system), and has an exit temperature of 83° C. In the instant example, the high temperature heat sink could be used to superheat steam, generate steam or heat boiler feed water.

Having fully described the present invention, it will be apparent from the above description and drawings that various modifications may be made within the scope of the invention. Therefore, the invention is not intended to be limited to the particular process, apparatus and example except as may be required by the lawful scope of the following claims.

What is claimed is:

1. A process for the synthesis of ammonia carried out at a pressure greater than 100 atmospheres which process comprises passing a mixture of gases in continuous flow through apparatus so as to carry out the following steps:
    (a) passing at least a portion of an ammonia feed syngas through a heat exchanger to increase its temperature;
    (b) passing said feed syngas from (a) through a first ammonia synthesis catalyst bed to obtain an effluent;
    (c) passing at least a portion of the effluent from (b) through the heat exchanger of (a) to decrease the temperature of said effluent;
    (d) passing the effluent from (c) through a series of at least two additional ammonia synthesis catalyst beds and then subsequent to each bed through a high temperature heat sink to decrease the temperature of the effluent and to obtain a final product effluent; and
    (e) recovering ammonia from the final product effluent of the series in (d).

2. A process as recited in claim 1 wherein the process is carried out at a temperature between approximately 150 atmospheres to about 200 atmospheres.

3. A process as recited in claim 1 wherein the high temperature heat sink is comprised of a steam superheater.

4. A process as recited in claim 1 wherein the high temperature heat sink is comprised of a boiler feed water heating system.

5. A process as recited in claim 1 which includes heat exchange between at least a portion of the final product effluent in (d) and at least a portion of the feed syngas.

6. A method of improving yield in a process for the synthesis of ammonia carried out at a pressure greater than 100 atmospheres, which method comprises (a) at least three catalyst beds in series over which the ammonia feed syntas passes in continuous flow; (b) controlling the temperature of the feed syngas from the first catalyst bed by means of heat exchange with the feed syngas to the first catalyst bed; and (c) controlling the temperature of effluent from all subsequent catalyst beds in series by means of a high temperature heat sink in series with the effluent of each.

* * * * *